United States Patent
Hatcher

[15] 3,669,840

[45] June 13, 1972

[54] GLUCONIC ACID PRODUCTION

[72] Inventor: Herbert J. Hatcher, Bloomington, Minn.

[73] Assignee: Economics Laboratory, Inc., St. Paul, Minn.

[22] Filed: Nov. 25, 1969

[21] Appl. No.: 879,807

[52] U.S. Cl. .......................................................... 195/36 R
[51] Int. Cl. ............................................................... C12d 1/02
[58] Field of Search ................................................. 195/36 R

[56] References Cited

UNITED STATES PATENTS 2,651,592  9/1953  Baker ........................................ 195/36
1,726,067  8/1929  Herrick et al ............................. 95/36

OTHER PUBLICATIONS

Underkofler et al., Industrial Fermentations Chemical Publishing Co. Inc., Vol. I. pp. 446–469 (1954).

*Primary Examiner*—Alvin E. Tanenholtz
*Attorney*—Merchant & Gould

[57] ABSTRACT

Gluconic acid is produced by a fermentation process in which an inoculum of the fungus Aspergillus niger is transferred to a first production medium containing a source of glucose at a time when the glucose oxidase activity of the inoculum is increasing at its maximum rate. The fungus mycelium can be separated from the production medium at harvest time and reused in successive production media without the need for added nutrients until such time as nutrients are needed to revive the glucose oxidase activity.

7 Claims, 3 Drawing Figures

INVENTOR.
HERBERT J. HATCHER
BY
Merchant & Gould
ATTORNEYS

GLUCONIC ACID PRODUCTION

BACKGROUND OF THE INVENTION

In the present state of the art, gluconic acid (as well as its calcium and sodium salts) are produced in commercial quantities by growing a strain of the fungus *Aspergillus niger* in a production fermentation medium of high carbon content and low nitrogen content. The carbon is present in the form of glucose or a precursor thereof (e.g. corn syrup or chipped dextrose). Corn steep liquor, urea, and diammonium phosphate frequently serve as the nitrogen sources. A magnesium salt of some form (e.g. magnesium sulfate) is also included in the production medium as an essential component thereof.

The commercial process for producing gluconic acid with the fungus *Aspergillus niger* is generally considered to be one of fermentation. An inoculum of *Aspergillus niger* for use in the production fermentation medium is developed through successive transfers to growth vessels of increasing volume, each of which contains a growth medium similar in composition to that of the production fermentation medium. At inoculation, the inoculum usually amounts to 10–20 percent of the production volumes. Production of gluconic acid is performed in a fermentation vessel and is fostered under conditions of high aeration, agitation, and back pressure. Because the production of gluconic acid causes a reduction in pH, pH serves as a limiting factor and is often controlled by either base addition or by the use of buffer salts.

SUMMARY OF THE INVENTION

The present invention involves the discovery that the prior emphasis upon the maximum rate of growth of the fungus during inoculum preparation and during the production of gluconic acid was wrong. Instead, it has been discovered that the key to efficient production of gluconic acid using the fungus *Aspergillus niger* is to observe the glucose oxidase activity of the inoculum and to use this activity as a reference or control for determining when to transfer the inoculum to a first production medium. Maximum glucose oxidase activity is desired, not maximum cell growth. Moreover, the production or fermentation medium does not always need to contain nutrients in amounts sufficient to sustain further growth of the organism. In fact, it is desirable if the substantial presence of such nutrients (e.g. nitrogen and magnesium) is avoided, particularly in the first production medium.

After the production of gluconic acid in the first production medium has reached a peak, the fungus mycelium can be separated from the production liquor and the mycelium used to inoculate a second production medium, which may be operated in the absence of added nutrients in amounts needed to sustain organism growth. This procedure can be repeated until a drop in glucose oxidase activity is observed. Then, nutrients can be included in the next production medium in amounts sufficient to rehabilitate the glucose oxidase activity of the mycelium.

The process of the present invention is capable of producing the following advantages:

1. the conversion of glucose to gluconic acid at working concentrations of glucose (or a glucose source) which are higher than those normally used in past commercial practices;
2. the total yield of gluconic acid per working volume is substantially increased as a result of being able to bring about the production of gluconic acid at higher glucose concentrations;
3. the time required to complete the fermentation cycle and produce a given quantity of gluconic acid can be substantially reduced;
4. the fungus mycelium can be reused significantly more times than is ordinarily common to present commercial practices.

DETAILED DESCRIPTION

GLUCONIC ACID AND ITS SALTS

Figure 2:
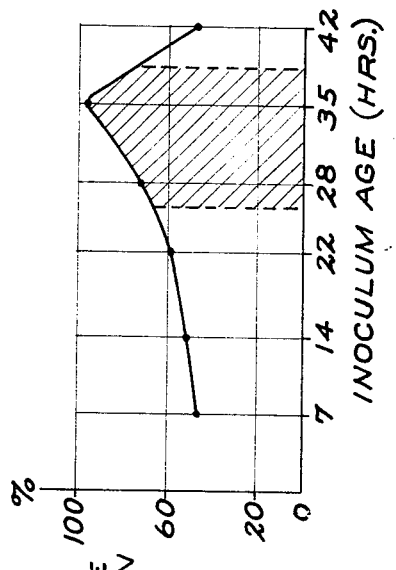
FIG. 2 is a graph showing the percent of glucose in a production medium which was converted to gluconic acid in a fixed time period using inoculum of various ages (and hence different glucose oxidase activities).

Gluconic acid and its salts (e.g. sodium gluconate) are known compounds having known uses. For example, gluconic acid is a colorless, or nearly colorless, light brown syrupy liquid with a mild acid taste. It is soluble in water and alcohol. It is used in the preparation of pharmaceutical and food products, in the pickling of metals, as a sequesterant in detergent formulations, as a cleanser for bottle washing; in paint removing products; and in alkaline de-rusters.

THE FUNGUS

The fungus used in this invention is the fungus, *Aspergillus niger*. As known in the art, strain selection can play an important role in micro biological processes such as this. Thus, all strains do not serve with equal effectiveness although the invention is applicable to any known strain of the fungus *Aspergillus niger*. A particularly useful modified strain of the fungus *Aspergillus niger* is the one identified as American Type Culture Collection No. 12846. This particular strain has been found to be unusually advantageous in converting corn syrup solutions into gluconic acid in high yields using the invention as hereinafter described. Moreover, with this particular strain it is possible to utilize cruder corn syrup than is normally employed in commercial operations and still maintain high conversion rates.

PREPARATION OF THE INOCULUM

The inoculum for the fermentation is developed through successive transfers of the culture to growth vessels of increasing volume. The volume transferred from one stage to the next will typically vary from 10–20 percent of the volume of the receiving medium. The age and amount of organism grown in each stage is important as known in the art. These factors will vary with the particular method of growth, vessel design, and strain of organism. For example, by varying growth conditions (e.g. aeration and agitation) the organism may be allowed to grow at various stages in the process for periods of as little as 5 hours to as long as 7 days or more.

The preparation of a suitable inoculum is illustrated by the following example in which the organism is grown successively in slant and germination media and thereafter transferred to an inoculum media where the inoculum growth is completed. It is the growth in the final stage (i.e. in the inoculum medium) that is so important for purposes of this invention.

EXAMPLE 1

The fungus, *Aspergillus niger* (ATCC No. 12846) was grown for 5 days at 30° C in 20 × 150 mm test tubes containing 10 ml of a slant medium (i.e. a first growth medium) having the following composition in grams per liter.

| Ingredient | gms/L. |
| --- | --- |
| Glucose | 30.0 |
| Magnesium sulfate septahydrate | 0.10 |
| Potassium phosphate monobasic | 0.12 |
| Ammonium nitrate | 0.25 |
| Bacto peptone | 0.25 |
| Dehydrated potatoes | 44.0 |
| Calcium carbonate | 4.0 |
| Bacto agar | 25.0 |
| Tap water | to 1 liter | pH after adjustment with
dilute sulfuric acid                                pH 6.5

By the end of the 5-day growth period, abundant conidia formation had occurred.

A suspension of the conidia was then prepared by the addition thereto of 5 ml of sterile water containing a surfactant (e.g. Tween 80). The suspension was then used to inoculate a germination medium (i.e. a second growth medium) having the following composition in grams per liter.

| Ingredient | gms/L. |
|---|---|
| Glucose | 59.0 |
| Corn steep liquor | 3.4 |
| Magnesium sulfate septahydrate | 0.02 |
| Potassium phosphate monobasic | 0.022 |
| Urea | 0.012 |
| Diammonium phosphate | 0.047 |
| Whole dried yeast | 0.5 |

Before inoculation, the pH of this germination medium was adjusted to pH 6.5 with 20 percent sodium hydroxide and made up to volume with tap water (i.e. 1 liter). A suitable quantity of an antifoaming agent was added. The germination medium was then dispensed into 5 1-liter baffled Erlenmeyer flasks, using only 200 ml of germination medium per flask. Each of the flasks of germination medium were then sterilized in an autoclave for 20 minutes at 121° C, cooled and inoculated with 8 ml of conidiospore suspension prepared as described above. The cultures were incubated for 24 hours at 30° C in a New Brunswick Rotary Incubator Shaker operating at about 180 rpm. The resulting germination cultures were then combined and 1,000 ml of the 24-hour germination culture was used to inoculate 8,000 ml of an inoculum medium (i.e. a third growth medium) in a 14-liter Pyrex New Brunswick Fermentor Jar. The inoculum medium had the following composition in grams per liter.

| Ingredient | gms/L. |
|---|---|
| Corn syrup | 120.0 |
| Corn steep liquor | 30.0 |
| Epsom salts | 0.2 |
| Urea | 0.125 |
| Whole dry yeast | 5.0 |
| Diammonium phosphate | 0.5 |
| Water | As needed to 1 liter |
| Adjust to pH 6.5 and add an antifoam | |

Typical antifoams which have given satisfactory performance are Hodag K64, Hodag M-8, Hodag KG, and certain silicone-mineral oil combinations. Experience has indicated that the age of the germination culture for the inoculum medium is not especially critical at this point, although ages of the germination culture from 10–30 hours (e.g. 18 to 24 hours) are particularly effective.

The inoculum culture was then incubated at 30° C. The temperature was maintained by means of a thermostatically controlled water bath. Agitation was provided by two disc-type impellers having four blades and rotating at 720 rpm. Filter sterilized air was passed into the inoculated medium by means of a pipe with its opening directly beneath the bottom impeller.

Figure 1:
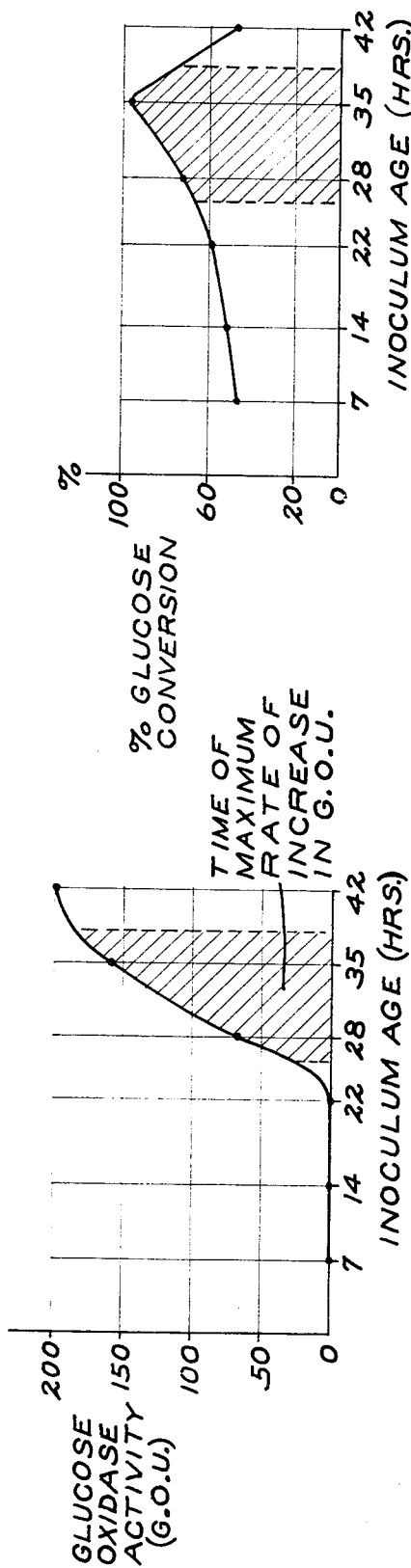
FIG. 1 is a graph showing the change of glucose oxidase activity (as measured in glucose oxidase units) with the age of the inoculum (measured in hours)

The age of the inoculum has been found to be very important. It is essential that the inoculum be used at a time at which the rate of increase in glucose oxidase activity is at or near its maximum (e.g. not less than 60 percent of the maximum rate and preferably not less than 80 percent of the maximum rate), if maximum production efficiency is to be obtained when the inoculum is transferred to a production medium. Reference is made to FIG. 1 in which the glucose oxidase activity of an inoculum is plotted against the age of the inoculum (i.e. age in the third growth stage). Note that the maximum rate of increase in glucose oxidase activity occurs in the period of from about 26 hours to about 38 hours. Transfer of the inoculum to the production medium at any time within this period is advantageous with the best production results generally being obtained if the transfer is made when the inoculum is within the middle portion of this range (e.g. the mid 75 percent), desirably near the inflection point of the curve (e.g. within plus or minus 2 hours of the inflection point or maximum rate).

Glucose Oxidase Activity

Glucose oxidase activity can be sensed or measured directly or indirectly by any of a variety of known ways.

One useful method is reported in Chemical Abstracts, 66, 9248 e (1966).

A modification of this reported method, useful in measuring glucose oxidase activity in the presence of biologically active materials such as fungal cells, is hereinafter described.

Add 0.5 ml of a sample to each of at least two 24 × 150-mm test tubes (one for test purposes and one as a control). Add one drop of 2 percent sodium azide or a suitable quantity of another catalase inhibitor such as hydrogen sulfide, sulfide salt, or cyanide. The tubes are shaken thoroughly and placed in a 30° C water bath. Add 4.5 ml of 10 percent glucose in 1.1 M acetate buffer, pH 5.6, to the test sample. If desired, the pH and buffers can be varied to give values from pH 4.5 to pH 6.0. Add 4.5 ml of 5 N $H_2SO_4$ to each control sample. After exactly 10 minutes, add 4.5 ml 5 N $H_2SO_4$ to each test sample and 4.5 ml glucose to each control sample. Then add 2.0 ml of fresh 5 percent potassium iodide and 1 drop of 1 percent ammonium molybdate to each tube (test and control). Let the tubes stand for 3 minutes. Titrate the test samples with 0.02 N sodium thiosulfate using a starch indicator. Results are expressed in terms of glucose oxidase units (GOU) per ml or gram giving 1 micromole of gluconic acid per hour.

$$GOU = 240 \, (ml \, of \, 0.02 \, N \, Na_2S_2O_3)$$

PRODUCTION OF GLUCONIC ACID

The production of gluconic acid using an inoculum of *Aspergillus niger* is accomplished by inoculating a production medium with the inoculum and then fermenting or aging the inoculated medium under pre-determined conditions of agitation, aeration, and back pressure.

As previously indicated, reference to the glucose oxidase activity of the inoculum during the incubation of the inoculum determines the optimum time for transferring the inoculum to the production medium.

The first production medium does not need to contain nutrients in amounts sufficient to sustain further growth of the organism. In fact, it is desirable if the substantial presence of such nutrients (e.g. nitrogen and magnesium) is eliminated. Thus, the first production medium can consist essentially of a source of glucose together with foam inhibitors and agents for controlling pH. The absence of added nutrients permits the carbohydrate source (i.e. glucose) to be increased in concentration, thereby increasing the yield of gluconic acid per unit of working volume. Further, nutrients tend to thicken or increase the viscosity of the production medium so the absence of nutrients in the production medium avoids such increases in viscosity and makes possible the attainment of maximum turbulence and mass transfer of oxygen through aeration. Since the conversion of glucose to gluconic acid in the presence of glucose oxidase requires the participation of molecular oxygen, the use of a production medium which does not contain added nutrients is a great advantage.

After the first production medium has been inoculated, the organism continues to produce glucose oxidase, apparently at the expense of its own cell structure.

Harvest time is often picked as a balance between economic and technical factors. From a technical viewpoint, harvest time can be determined by following the glucose oxidase activity of the production culture.

At harvest time, aeration and agitation are halted and the fungus mycelium can be separated from the production liquor (e.g. by settling or centrifugal techniques) and used to inoculate a second production medium. This second production medium may also be operated in the absence of nutrients in amounts needed to sustain organism growth. This procedure can be repeated continuously until a material drop in glucose oxidase activity is observed. Then, nutrients can be included in the next successive production medium in amounts sufficient to rehabilitate the fungus mycelium.

Experiments have shown that the number of fermentation stages in which the mycelium can be used before requiring the addition of nutrients decreases with the usage of the mycelium. For example, in one experiment, the mycelium was used sequentially in two production media, both operating in the absence of added nutrients. In the third production medium, maintenance nutrients were added to rehabilitate the mycelium. The mycelium was again used in a fourth production medium in the absence of added nutrients. However, its use in a fifth production medium again required the addition of maintenance nutrients to revive the glucose oxidase activity.

Figure 3:
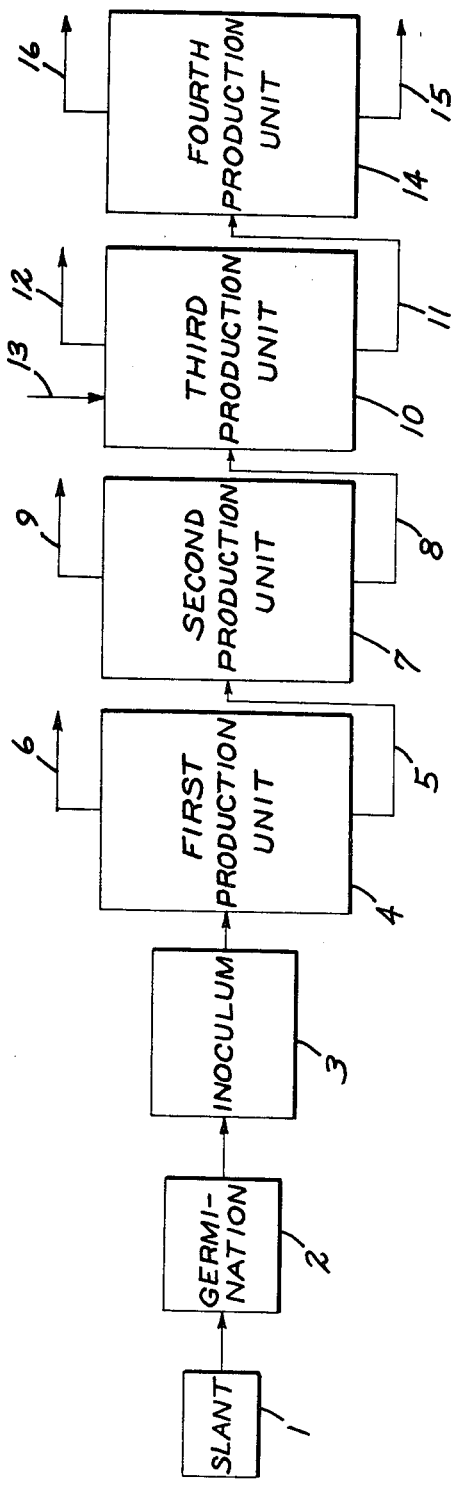
FIG. 3 is a flow diagram illustrating one commercial embodiment of this invention.

The concept of the present invention is illustrated in FIG. 3 wherein an inoculum is prepared in three successive stages designated as: slant culture stage 1, germination stage 2, and inoculum stage 3. The final inoculum (i.e. from stage 3) is then transferred to the first production unit 4. At harvest time, the production culture is separated into mycelium 5 and crude acid 6. The fungus mycelium 5 from the first production unit 4 is then transferred to the second production unit 7 and used to inoculate another production medium. At the next harvest time, crude acid 9 and fungus mycelium 8 are separated and the mycelium 8 is transferred to a third production unit 10. By this time, the glucose oxidase activity requires rehabilitation and maintenance nutrients 13 are introduced into the third production unit 10. At the next harvest time, crude acid 12 and fungus mycelium 11 are separated and the mycelium 11 is transferred to the fourth production unit 14. At the next harvest time, crude acid 16 is again separated from fungus mycelium 15.

The proper use of the inoculum to inoculate production media will be further understood by reference to the following specific examples. Unless otherwise indicated, all parts and percentages are by weight.

EXAMPLE 2

Production of gluconic acid was conducted in a fermentor of the type described with reference to the preparation of the inoculum in example 1 (i.e. the fermentor used in the third growth stage).

Twelve hundred ml of a 32-hour inoculum from example 1 were used to inoculate 7 kilograms of a production medium comprised mainly of a dextrose syrup solution, the final dextrose content being about 30 percent as calculated from the carbohydrate analysis. The production medium also contained magnesium sulfate (0.5 percent), and calcium carbonate (9 percent). After inoculation, 3 percent of puffed borax was added to solubilize the calcium gluconate. The inoculated production medium was then agitated and aerated.

After 20 hours of incubation, the gluconic acid concentration was determined by the lactone method of Lien (Analytical Chemistry 31 (8) pp. 1,363–1,366). A concentration of 29.5 percent by weight of gluconic acid was obtained, indicating a conversion of 91 percent of the calculated dextrose to gluconic acid. The residual dextrose content was negligible. Aeration and agitation of the fermentor was stopped and the fungus mycelium permitted to settle to the bottom of the production vessel.

After about 30 minutes of quiescence, the majority of the mycelial mass was forced into a second production vessel containing a production medium similar to that of the first vessel except that no magnesium sulfate was used. Roughly 20 percent, or about 1.5 liters of the original volume, was required. The second production unit was run in the same manner as the first, with assays for gulconic acid being conducted after 8, 10 and 12 hours of incubation. The results were as follows:

TABLE I

| Age | Percent Gluconic Acid (Wt %) | Conversion of Glucose - % |
|---|---|---|
| 8 | 25.2 | 78 |
| 10 | 27.7 | 86 |
| 12 | 29.5 | 91 |

Generally, only two recycles can be carried out without the use of nutrients. The need for nutrients in the production media can be ascertained by reference to glucose oxidase assay. In order to maintain turbulence and good aeration, the amount of nutrients added should be just sufficient to enable the organism to restore itself. Excess nutrients should not be used because the nutrients increase the viscosity of the system and tend to inhibit good aeration.

Two factors not closely controlled in this example and which have a marked influence on gluconic acid production are pH and back pressure in the production units. The pH level is best maintained automatically with sodium hydroxide. Back pressure should generally exceed and desirably be about 20–30 psig (e.g. 25 psig). If these factors had been controlled, it is reasonable to predict that even higher conversions of the dextrose would have been realized.

EXAMPLE 3

Twelve 250-ml baffled Erlenmeyer flasks each containing 50 ml of the germination medium of example 1 were inoculated with conidiospores as described in example 1. After 24 hours growth with shaking at 30° C, the total contents were used to inoculate 12 2-liter baffled Erlenmeyer flasks each containing 400 ml of the inoculum medium of example 1. The cultures were incubated at 30° C with shaking as described in example 1. At periodic intervals, starting 7 hours after inoculation, two flasks were removed from the shaker and 50 ml samples taken from each for analyses. With each pair of flasks the remaining contents of the two flasks (about 700 ml), was used to inoculate 5 kilograms of a production medium containing dextrose syrup solution. The production medium contained 21 percent dextrose (calculated from total carbohydrate analysis of a 71 DE syrup), 3.8 percent calcium carbonate, and 0.3 percent borax. Each production unit was operated at 720 rpm, was aerated with 5 liters of air per minute, and operated at 30° C. After 20 hours of incubation, a sample was taken from each fermentor for analysis for gluconic acid, glucose and glucose oxidase activity. Glucose oxidase activity was determined by the modified procedure of Levina et al., previously described. The results of these experiments are given in the following table and are graphically presented in FIGS. 1 and 2.

TABLE II

| Inoculum Age, Hours | Glucose Oxidase Activity of the Inoculum (GOU) | Inoculation results Gluconic Acid | | Glucose Oxidase Activity (GOU) |
|---|---|---|---|---|
| | | % (W/W) | Glucose Conversion | |
| 7 | 0 | 10.8 | 47.2 | 252 |
| 14 | 0 | 11.6 | 50.6 | 324 |
| 22 | 0 | 13.6 | 59.4 | 331 |
| 28 | 72 | 16.4 | 71.6 | 356 |
| 35 | 160 | 22.4 | 97.9 | 382 |
| 42 | 200 | 10.9 | 47.6 | 156 |

The correlation between the glucose oxidase activity found for the inoculum and the amount of gluconic acid formed in the production phase is readily apparent in the table. Optimum age for the inoculum is of major importance, can be expected to be somewhat variable, and reaches a sharp peak in terms of glucose conversion (See FIG. 2). Once the optimum age has been passed, use of the inoculum would result in very poor production performance. See again FIGS. 1 and 2. Use of the glucose oxidase assay as described herein enables one to determine at what age the inoculum should be used (at maximum geometric increase of activity) and also when it is necessary to add nutrient to recycled fungal mass to maintain activity.

What is claimed is:

1. In the process of preparing gluconic acid wherein a first production medium containing a source of glucose is inoculated with an inoculum of *Aspergillus niger*, the glucose source is converted into gluconic acid and a fungus mycelium is produced, the improvement which comprises:
   a. sensing the glucose oxidase activity of the inoculum; and
   b. transferring the inoculum to the first production medium when the glucose oxidase activity of the inoculum is increasing at about its maximum rate.

2. Improved processes of claim 1 wherein the harvest time is determined by reference to the glucose oxidase activity in the inoculated production medium.

3. Improved processes of claim 1 wherein the time of transfer of the inoculum occurs within plus or minus 2 hours of the maximum rate of increase in glucose oxidase activity.

4. Improved processes of claim 1 wherein the production medium contains corn syrup as a glucose source without added nutrients for fungal growth.

5. Improved processes of claim 4 wherein the fungus is American Type Culture Collection No. 12846 and the rate of increase in glucose oxidase activity of the inoculum at the time of transfer is not less than 80 percent of the maximum rate.

6. Improved processes of claim 4 wherein the fungus mycelium is separated from the first production medium after the production of gluconic acid and the mycelium is transferred to a second production medium for further production of gluconic acid, said second production medium also being without nutrients.

7. Improved processes of claim 4 wherein:
   a. the fungus mycelium is separated from the first production medium after the production of gluconic acid;
   b. wherein the separated fungus mycelium is successively transferred from one production medium to another; and
   c. wherein the need for nutrients in each successive production medium is determined by reference to the glucose oxidase activity in the preceding production medium, the presence of said nutrients being avoided until such are needed to revive glucose oxidase activity.

* * * * *